Dec. 2, 1969 W. J. LAWSON 3,482,164

PORTABLE REMOTE CONTROL CONSOLE

Filed June 13, 1966 2 Sheets-Sheet 1

INVENTOR.
WILLIAM J. LAWSON
BY Harry A. Herbert Jr. and
Julian L. Siegel
ATTORNEYS Dec. 2, 1969 W. J. LAWSON 3,482,164

PORTABLE REMOTE CONTROL CONSOLE

Filed June 13, 1966 2 Sheets-Sheet 2

INVENTOR.
WILLIAM J. LAWSON

BY Harry A. Herbert Jr. and Julian L. Siegel
ATTORNEYS

United States Patent Office 3,482,164
Patented Dec. 2, 1969

3,482,164

PORTABLE REMOTE CONTROL CONSOLE

William J. Lawson, Poteet, Tex., assignor to J. I. Case, Company, Racine, Wis., a corporation of Wisconsin Filed June 13, 1966, Ser. No. 557,867
Int. Cl. H04b *1/40, 1/44*
U.S. Cl. 325—21 1 Claim

ABSTRACT OF THE DISCLOSURE

A control console using a push-to-talk relay that controls power to a plurality of transmitter relays and the muting of a plurality of receiver speakers. Each of the plurality of the receiver-transmitter combinations is further controlled by a ganged switch connecting power to the transmitter relay, connecting a common microphone to the transmitter, and placing the receiver speaker in position to be muted by the push-to-talk relay.

This invention relates to a control tower console, and more particularly to a portable console that can easily be substituted for a permanent console.

This invention is a portable type console for use by control tower operators to transmit and receive on a plurality of frequencies when the permanent console is removed for service, such as for major overhaul and rewiring. This portable console uses a minimum number of parts and is small enough to be transported by one person. The technique of operating this console is similar to the permanent control tower consoles in present use, so that operators can operate this portable console without additional training.

Functions provided by this invention include muting the receiver audio when a "push-to-talk" microphone switch is depressed, a ready light when the transmit switch is in position, an indicator light associated with each speaker, and individual volume control for each speaker.

An object of this invention is to provide means for complete rehabilitation of tower control consoles without need for a mobile control tower.

It is another object to provide a portable control console having maximum reliability and minimum maintenance as a result of the number of components used.

It is yet another object of this invention to provide a portable control console using a novel arrangement of speakers, switches, lamps, transformers, volume pads, relay and microphone jack, wired in such a manner to provide a unit small enough to be completely portable.

This invention has a feature that keys and modulates a multiplicity of remote radio transmitters over existing remote lines and can monitor associated receivers with visual indication during audio reception with individual volume control for each of the speakers. It can mute corresponding receiver channels when transmitting only when the "push-to-talk" switch on the microphone is operating. Visual indication by means of a "ready" light indicate that one of the transmit keys is in the "ready" position and the circuit to the keying relay is electrically complete. This same "ready" light is extinguished when the "push-to-talk" switch is operated, indicating that a remote keying signal is connected to a remote line and transmission can commence. The same light will show a low battery voltage if it fails to light when a transmit key of a known good circuit is in the "ready" position.

Another feature of this invention is that the intensity of the receiver monitor indicator lights follow the audio pattern of the received signal exactly. This aids operating personnel considerably in monitoring simultaneous reception since standard consoles now in operation only give an on or off indication.

These and other objects, features and advantages will become more apparent from the following description taken in connection with the illustrative embodiments in the accompanying drawings, wherein.

Figure 1:
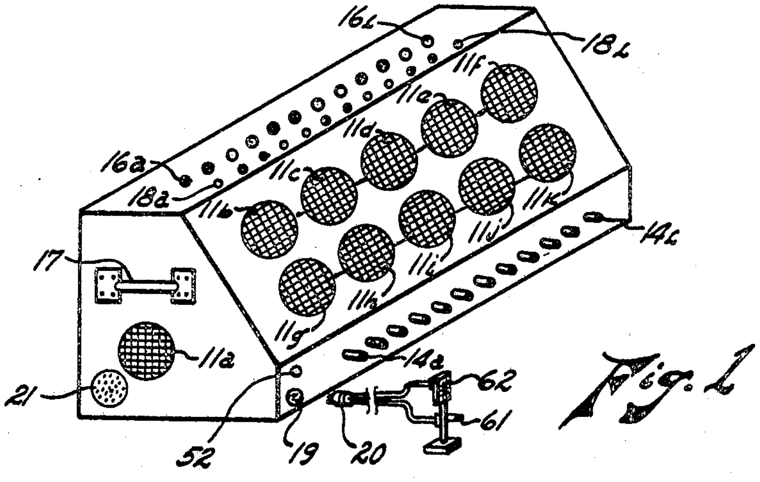
FIGURE 1 shows the console assembly and housing for the invention.
Figure 3:
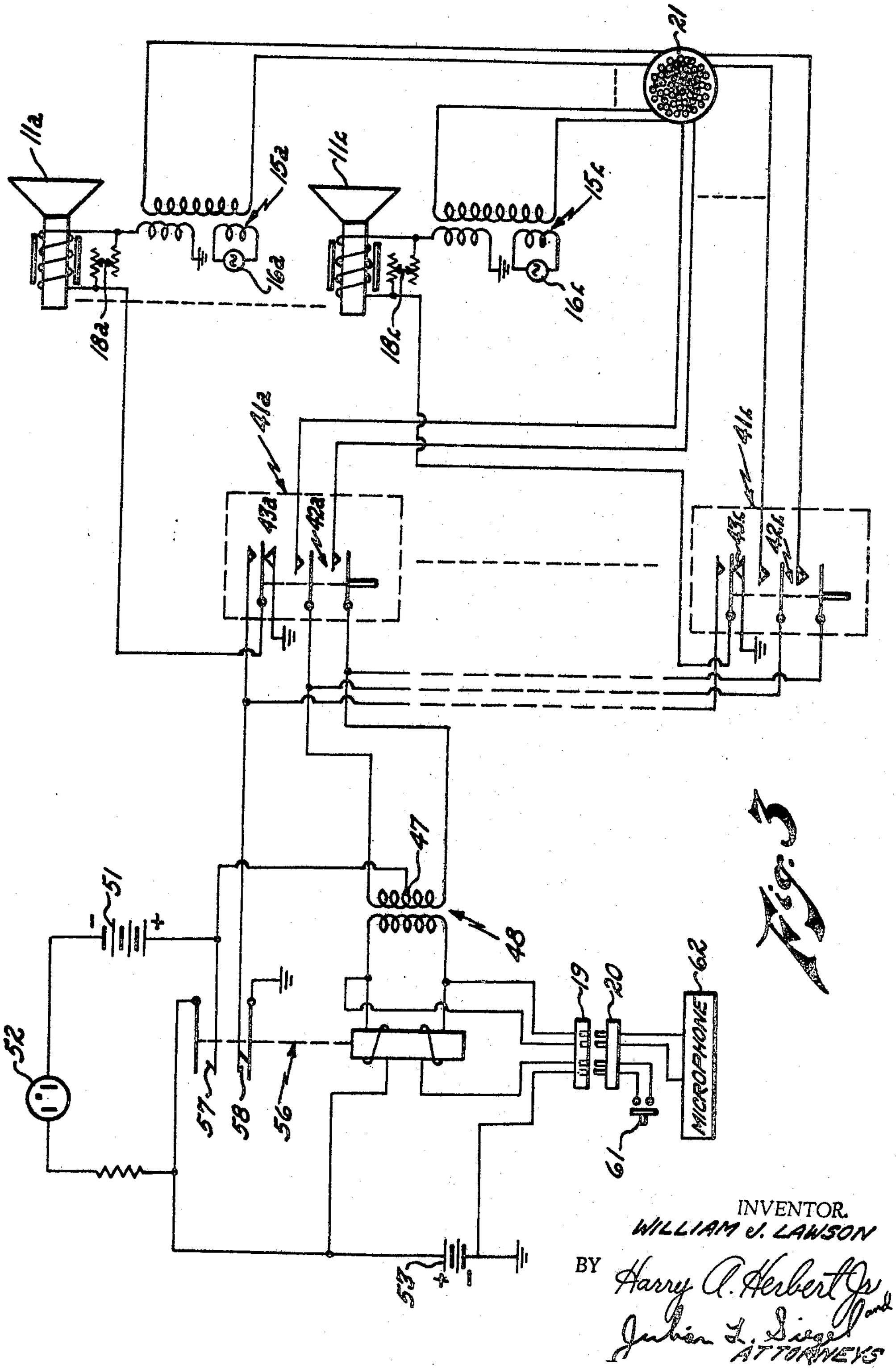
FIGURE 3 is a wiring diagram of the circuits showing interconnection of parts.

The invention as described herein uses twelve transmit-receive channels, but it is understood that any number can be used. The console shown in FIGURE 1 can control twelve corresponding transmitters and receivers. Twelve speakers 11*a* to 11*l* are displayed, ten on the front and one on each side. The associated lever switches 14*a* to 14*l* select the transmitter-receiver combination. When any of speakers 11*a* to 11*l* are in operation, the corresponding indicator lights 16*a* to 16*l* are activated and the volume of speakers 11*a* to 11*l* is controlled by volume controls 18*a* to 18*l*. Indicator lights 16*a* to 16*l* could be connected in series with speakers 11*a* to 11*l* respectively. However, by connecting indicator lights 16*a* to 16*l* independently to transformers 15*a* to 15*l* as shown in FIGURE 3, speakers 15*a* to 15*l* continue to function even in event of blowout of their corresponding indicator lights. Microphone 62 and "push-to-talk" switch 61 are connected to 4-pin plug 20 which is inserted in 4-pin jack 19. When "push-to-talk" switch 61 is depressed, neon lamp 52 is illuminated, which is a fail-safe feature. All of the receivers and transmitters are connected to the console by multiple pin jack 21. The console is made easily portable with carrying handles 17.

Figure 2:
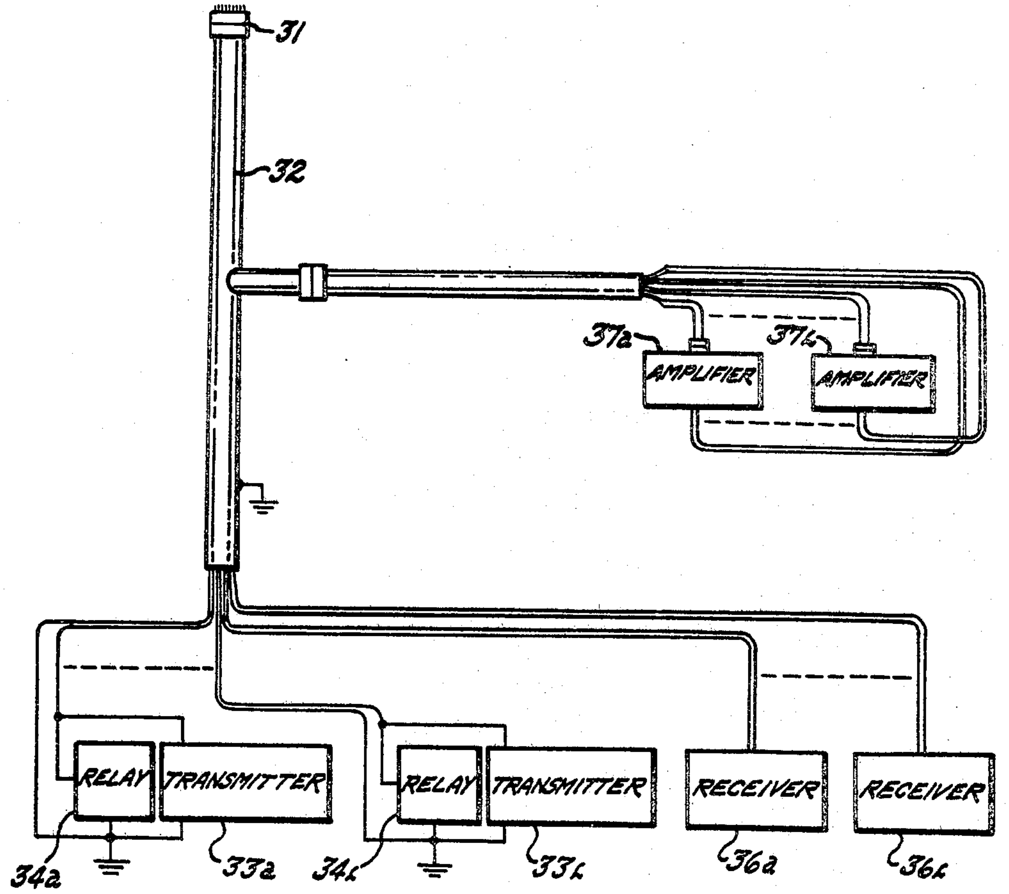
FIGURE 2 shows the remote connections of the audio amplifiers, receivers, transmitters, and their relays.

Referring to FIGURE 2, multiple-pin plug 31 connects cable 32 to jack 21. This conects transmitters 33 with transmitter keying relays 34*a* to 34*l*, and also connects receivers 36*a* to 36*l* to the console via amplifiers 37*a* to 37*l*.

Each ganged switch 41*a* to 41*l* of FIGURE 3 has transmitter section 42*a* to 42*l* which is normally open and receiver section 43*a* to 43*l* which normally connect speakers 11*a* to 11*l* directly to ground. When operating any of the transmitter section 42*a* to 42*l* of switches 41*a* to 41*l*, the ground from corresponding transmitter site relay 34*a* to 34*l* is connected to center tap 47 of common transformer 48. This completes the circuit through two batteries, 51 and 53, and lights neon "ready" lamp 52. At the same time the ground on switches 41*a* to 41*l* that completes the audio circuit of speakers 11*a* to 11*l* is removed and the audio circuit is transferred to the ground through normally closed receiver trip contacts 58 of relay 56. Relay 56 also include normally open transmitter trip contacts 57. When "push-to-talk" switch 61 of microphone 62 (if a "push-to-talk" telephone hand set is used) is operated, relay 56 is activated, which mutes the chosen speaker 11*a* to 11*l* by opening relay trip contacts 58 that were furnishing ground to the particular speaker 11*a* to 11*l*. When trip contacts 57 make, it shunts auxiliary battery 51 which is in series with the neon "ready" lamp 52, and reduces the voltage below that required to operate neon lamp 52 which causes it to be extinguished. This effectively opens the circuit which is a fail-safe feature that tells the operator or maintenance man instantly that relay 56 did not operate and that the contacts furnishing keying voltage to the selected transmitter relay 34*a* to 34*l* were not dirty or otherwise open.

If the invention was desired for multiple options in addition to air traffic control, such as for direct communication in work load control centers, data control, etc., the only changes necesary would be to provide additional contacts on one relay 56, provide lever switches with three positions (one position would be nonlocking for ringing purposes), and an option board with appropriate wiring so straps could be connected to furnish various types of service, such as two-way loudspeaker communications, direct lines to common telephones, loudspeaker service on regular dial telephone lines, amplification through regular telephone for hard-of-hearing persons or when regular telephone reception is too weak, paging and public address services.

What I claim is:

1. A remote control console system comprising:

(a) a single push-to-talk relay connected to a microphone having transmitter trip contacts normally open and receiver muting trip contacts normally closed;

(b) a voltage source;

(c) a plurality of transmitter-receiver units, each unit comprising:

(1) a transmitter having a keying relay;

(2) a receiver having a speaker; and (3) a ganged switch simultaneously connecting the transmitter keying relay to the voltage source with the transmitter contacts of the push-to-talk relay interposed between the voltage source and the ganged switch, and connecting the speaker to the receiver muting trip contacts of the push-to-talk relay, (d) a ready light in shunt with the transmitter trip contacts, the ready light being illuminated upon activation of any of the plurality of ganged switches and being extinguished upon activation of the push-to-talk relay;

(e) indicator lights coupled to the receivers for showing receiver response; and (f) means for controlling the volume of the speakers.

References Cited

UNITED STATES PATENTS

| | | | |
|---|---|---|---|
| 2,883,521 | 4/1959 | Curry | 325—53 |
| 3,394,311 | 7/1968 | Pursley | 325—22 |

ROBERT L. GRIFFIN, Primary Examiner

ALBERT J. MAYER, Assistant Examiner

U.S. Cl. X.R.

325—22

PO-1050
(5/69)

UNITED STATES PATENT OFFICE
CERTIFICATE OF CORRECTION

Patent No. 3,482,164 Dated December 2, 1969

Inventor(s) William J. Lawson

It is certified that error appears in the above-identified patent and that said Letters Patent are hereby corrected as shown below:

Column 1, lines 3 and 4, delete "assignor to J. I. Case, Company, Racine, Wis., a corporation of Wisconsin".

SIGNED AND
SEALED
JUL 14 1970

(SEAL)
Attest:

Edward M. Fletcher, Jr.
Attesting Officer

WILLIAM E. SCHUYLER, JR.
Commissioner of Patents